(12) United States Patent
Schuringa et al.

(10) Patent No.: US 8,582,515 B2
(45) Date of Patent: Nov. 12, 2013

(54) OPTIMIZATION OF 3GPP NETWORK ATTACHMENT

(75) Inventors: Jon Schuringa, Langen (DE); Jens Bachmann, Langen (DE); Jun Hirano, Kanagawa (JP); Shinkichi Ikeda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 300 days.

(21) Appl. No.: 12/935,507

(22) PCT Filed: Mar. 12, 2009

(86) PCT No.: PCT/EP2009/001794
§ 371 (c)(1),
(2), (4) Date: Dec. 16, 2010

(87) PCT Pub. No.: WO2009/129893
PCT Pub. Date: Oct. 29, 2009

(65) Prior Publication Data
US 2011/0110249 A1    May 12, 2011

(30) Foreign Application Priority Data
Apr. 24, 2008 (EP) .................................. 08007955

(51) Int. Cl.
*H04W 4/00* (2009.01)
(52) U.S. Cl.
USPC ............................ 370/329; 370/252; 455/450
(58) Field of Classification Search
None
See application file for complete search history.

(56) References Cited

U.S. PATENT DOCUMENTS

| | | | |
|---|---|---|---|
| 5,828,661 A * | 10/1998 | Weaver et al. | 370/331 |
| 6,731,932 B1 | 5/2004 | Rune | |
| 2002/0061751 A1* | 5/2002 | Zhao | 455/442 |
| 2006/0116122 A1 | 6/2006 | Verma | |
| 2009/0047955 A1* | 2/2009 | Frenger et al. | 455/436 |
| 2011/0263274 A1* | 10/2011 | Fox et al. | 455/456.2 |

FOREIGN PATENT DOCUMENTS

| | | |
|---|---|---|
| EP | 1 655 644 | 5/2006 |
| WO | 98/49846 | 11/1998 |
| WO | 01/52589 | 7/2001 |
| WO | 2006/135542 | 12/2006 |

OTHER PUBLICATIONS

International Search Report dated May 14, 2009.
3GPP TS 23.401 V8.0.0, "General Packet Radio Service (GPRS) enhancements for Evolved Universal Terrestrial Radio Access Network (E-UTRAN) access (Release 8)," XP-002471565, Dec. 2007, 1-167.
M. Mouly, et al., "The GSM System for Mobile Communications," XP-002080984, Jan. 1993, pp. 489-492.

* cited by examiner

*Primary Examiner* — Jianye Wu
(74) *Attorney, Agent, or Firm* — Dickinson Wright PLLC

(57) ABSTRACT

The current invention relates to a method for a network attachment procedure and a user equipment in a wireless mobile network, the wireless mobile network comprising a user equipment with a temporary identity and at least one mobility management entity. The method comprises the steps of providing an estimation whether the user equipment is unknown at the mobility management entity and sending the user equipment's temporary identity during the network attachment procedure. If the user equipment has been estimated to be unknown at the at least one mobility management entity, the user equipment's identity is sent during the network attachment procedure. These steps are carried out by the user equipment.

6 Claims, 9 Drawing Sheets

OPTIMIZATION OF 3GPP NETWORK ATTACHMENT

FIELD OF THE INVENTION

The invention relates to a method for a network attachment in a wireless mobile network. Furthermore, the invention also provides a user equipment and its operation in view of the method for network attachment defined herein.

TECHNICAL BACKGROUND

UMTS (Universal Mobile Telecommunications System) is the 3G (3rd Generation) mobile communication system standardised by 3GPP (3rd Generation Partnership Project). The first release of the specification of UMTS was published in 1999 (Release 99). In the mean time several improvements to the standard have been standardized by the 3GPP in Release 4, Release 5 and Release 6. With the desire to support higher data rates, it was decided to develop a new Air Interface and also a new evolved radio access network, E-UTRAN (UMTS Terrestrial Radio Access Network). The 3GPP launched a study item "Evolved UTRA and UTRAN" better known as "Long Term Evolution (LTE)". The study will investigate means of achieving major leaps in performance in order to improve service provisioning, and to reduce user and operator costs. Out of that and because interworking with other radio access technologies should be possible, the need arose for a new evolved Packet Core Network.

The E-UTRAN architecture consists of evolved Node Bs (eNB or eNodeB), providing the E-UTRA user plane (PDCP/RLC/MAC/PHY) and control plane (RRC) protocol terminations towards the mobile node, as explained below.

The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Up-Link-Quality of Service), cell information broadcast, ciphering/deciphering of user and control plane data, and compression/decompression of DL/UL (DownLink/UpLink) user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME, and to the Serving Gateway (S-GW) by means of the S1-U. The S1 interface supports a many-to-many relation between MMEs/Serving Gateways and eNBs.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the Home Subscriber Server, HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (Serving GPRS Support Node). The MME also terminates the S6a interface towards the home HSS for roaming UEs.

The Packet Data Network Gateway (PDN-GW) provides connectivity for the UE to external packet data networks by being the point of exit and entry of traffic for the UE. A UE may have simultaneous connectivity with more than one PDN-GW for accessing multiple PDNs. The PDN-GW performs policy enforcement, packet filtering for each user, charging support, lawful Interception and packet screening. Another key role of the PDN-GW is to act as the anchor for mobility between 3GPP and non-3GPP technologies.

To summarize the above, in order to support the new E-UTRAN access, the new 3GPP Core Network is mainly separated into three logical entities. At first, in the user plane the PDN-GW is the gateway to the external networks and the global mobility anchor for mobility between 3GPP and non-3GPP access technologies (like CDMA2000, WiMAX or WIFI). Second, another user plane entity being the Serving Gateway is the mobility anchor for mobility between 3GPP accesses (E-UTRAN, UTRAN, GERAN). Thirdly, a Mobility Management Entity is the control plane entity responsible for the mobility management of mobile terminals (also referred to in the following as UEs or MNs) moving between different EUTRAN base stations (eNodeBs) and also responsible for the session management.

The MMEs are connected to the eNodeBs, and one MME might be serving a number of eNodeBs so that multiple MMEs are necessary within the system to cover all eNodeBs. Furthermore, a pool of MMEs might be serving the same set of eNodeBs, e.g. for load balancing reasons.

As described above, the MME is responsible for mobility management and session management. For each mobile terminal attached to an MME, specific mobility management and evolved packet system context information is stored in the MME. These contexts comprise, e.g. the mobility state, the temporary identity, the current Tracking Area List, last known cell, authentication vectors, access restrictions, subscribed QoS profile, subscribed charging characteristics, and for each active PDN connection the APN (Access Point Name) in use, IPv4/IPv6 addresses, PDN-GW address for control plane, and also information for each EPS (Evolved Packet System) bearer within the PDN connection, as for example EPS bearer QoS profile, EPS bearer charging characteristics.

Furthermore, the context for a mobile terminal in an MME might be available even if the mobile terminal is detached from the 3GPP access. This context preservation allows for faster session setup when again switching on in the 3GPP access or when handing over from a non-3GPP access back to the 3GPP access, mainly because signalling with the Home Subscriber Server (HSS) is saved.

The following two sections give some additional background information about two important topics in this invention: Identities and context management.

UE Identifiers

Each UE can be identified by its IMSI, which is a permanent identity of the subscriber and this is a globally unique identifier.

Next to the IMSI, each UE is assigned a Globally Unique Temporary Identity (GUTI) by the MME. The GUTI is used to support subscriber identity confidentiality, and, in the shortened S-TMSI form, to enable more efficient radio signalling procedures (e.g. paging and Service Request).

The GUTI has two main components:
one that uniquely identifies the MME which allocated the GUTI; and
one that uniquely identifies the UE within the MME that allocated the GUTI.

UE Context

FIG. 1 illustrates the context management procedure. While the UE is connected, the context of the UE at the MME is always synchronized with the UE's data at the HSS. After the UE detaches, the MME receives a notification about it, and now has the option to keep the UE's context for a specific amount of time. The benefit of keeping the context at the MME is that if the UE reattaches to the network, the data at the MME can be reused.

While keeping the context at the MME, every change to the subscription info of the UE which is stored at the HSS (and of importance to the operation at the MME) gets updated to the MME. At the moment the MME decides to delete the context, it sends a "purge" message to the HSS, informing the HSS that it is about the delete the context. After receiving this message at the HSS, the HSS stops sending updates to the context at the MME. Note that the UE does not know about the existence of context at the MME.

PRIOR ART

The following procedure is also shown in FIG. 2.

The UE initiates the Attach procedure by the transmission of an Attach Request (IMSI or old GUTI) message together with an indication of the Selected Network to the eNodeB. IMSI shall be included if the UE does not have a valid GUTI available. If the UE has a valid GUTI, it shall be included. If available, the last visited TAI (Tracking Area Identifier) shall be included in order to help the MME produce a good list of TAIs for any subsequent Attach Accept message. Selected Network indicates the PLMN that is selected for network sharing purposes The eNodeB derives the MME from the GUTI and from the indicated Selected Network. If that MME is not associated with the eNodeB, the eNodeB selects an MME. The eNodeB forwards the Attach Request message to the new MME.

If the UE identifies itself with GUTI and the MME has changed since detach, the new MME sends an Identification Request (old GUTI) to the old MME to request the IMSI. The old MME/SGSN responds with Identification Response (IMSI, Authentication Quintets). If the UE is not known in the old MME/SGSN, the old MME/SGSN responds with an appropriate error cause.

If the UE is unknown in both the old MME/SGSN and new MME, the new MME sends an Identity Request to the UE to request the IMSI. The UE responds with Identity Response (IMSI).

FIG. 3 shows the same procedure and highlights the variants.

The problem is that there is significant signalling during network attach procedure. This not only creates more network traffic and processing in the network but foremost increases the network attach delay.

A simple solution would be that the UE always included its identity (IMSI) in its attach request message. In this way, the identity is always known, so there is no need to ask the old MME (signalling #3) or the UE itself (signalling #4). However, the disadvantage of this solution is that there is no location privacy since the IMSI is always sent and is non-encrypted so that all other UEs in the neighbourhood can potentially detect the existence of the UEs that are attaching to the network.

SUMMARY OF THE INVENTION

Therefore the object is to aim for faster network attachment and less signalling while at the same time keeping the same level of location privacy as in the prior art solution.

The object is solved by the subject matter of the independent claims. Advantageous embodiments of the invention are subject matters of the dependent claims.

One main aspect of the invention is to provide a method for a network attachment procedure in a wireless mobile network. The wireless mobile network comprises a user equipment with a temporary identity and at least one mobility management entity. The method comprising the steps of providing an estimation whether the user equipment is unknown at the mobility management entity and sending the user equipment's temporary identity during the network attachment procedure. If the user equipment has been estimated to be unknown at the at least one mobility management entity, the user equipment's identity is sent during the network attachment procedure. These steps are carried out by the user equipment.

According to an advantageous embodiment of the invention providing an estimation comprises using threshold levels to enable the making of a decision by the user equipment.

In a further advantageous embodiment of the invention the user equipment provides an estimation by being aware of when a last context update happened.

In another advantageous embodiment the step of providing an estimation comprises performing measurements during operation and keeping track of the measurements.

According to a further embodiment performing measurements comprises starting a timer after detaching from the mobility management entity.

In another embodiment the step of providing an estimation is carried out using statistical methods or neural networks or genetic algorithms or genetic programming or simulated annealing.

According to a further advantageous embodiment the step of providing an estimation comprises detecting whether the mobility management entity has lost a context.

In a further advantageous embodiment the step of detecting comprises detecting an unavailability of the temporary identity at a base station or receiving a message from the base station that the mobility management entity has lost the context.

According to another advantageous embodiment the step of providing an estimation comprises detecting an amount of traffic on the mobility management entity or monitoring a level of radio activity.

In another advantageous embodiment the step of detecting the amount of traffic comprises monitoring a frequency of broadcasted paging messages.

According to another advantageous embodiment of the invention the step of providing an estimation comprises detecting a manufacturer of the mobility management entity by explicit signaling or by detecting manufacturer-specific optional features or by detecting manufacturer-specific default values or differences in timing.

In a further advantageous embodiment the step of providing an estimation comprises receiving messages from the mobility management entity regarding whether the user equipment is unknown.

In another advantageous embodiment of the invention these messages are attached to already existing messages.

According to a further advantageous embodiment of the invention the existing message is an access network discovery and selection function message.

In a further advantageous embodiment the user equipment's estimation is corrected by a home subscriber service.

In another advantageous embodiment the GUTI does not need to be sent, i.e. the method comprises the steps of providing an estimation whether the user equipment is unknown at the mobility management entity and if the user equipment has been estimated to be unknown at the at least one mobility management entity, sending the user equipment's identity during the network attachment procedure, carried out by the user equipment.

According to another advantageous embodiment of the invention a user equipment is in a wireless mobile network carrying out a network attachment procedure. The wireless mobile network further comprises at least one mobility management entity. The user equipment has a temporary identity and comprises estimation means adapted to provide an estimation whether the user equipment is unknown at the mobility management entity. Transmission means send the user equipment's temporary identity during the network attachment procedure and transmission means send the user equipment's identity during the network attachment procedure if the user equipment has been estimated to be unknown at the at least one mobility management entity.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to an (evolved) UMTS communication system according to the LTE discussed in the Technical Background section above. It should be noted that the invention may be advantageously used for example in connection with a mobile communication system such as the LTE communication system previously described, but the invention is not limited to its use in this particular exemplary communication network.

This invention optimizes the procedure for 3GPP network attach, aiming for faster network attachment and less signalling. The UE uses hints to predict the state of its cached context at the MME, and reacts according to its prediction.

Figure 1:
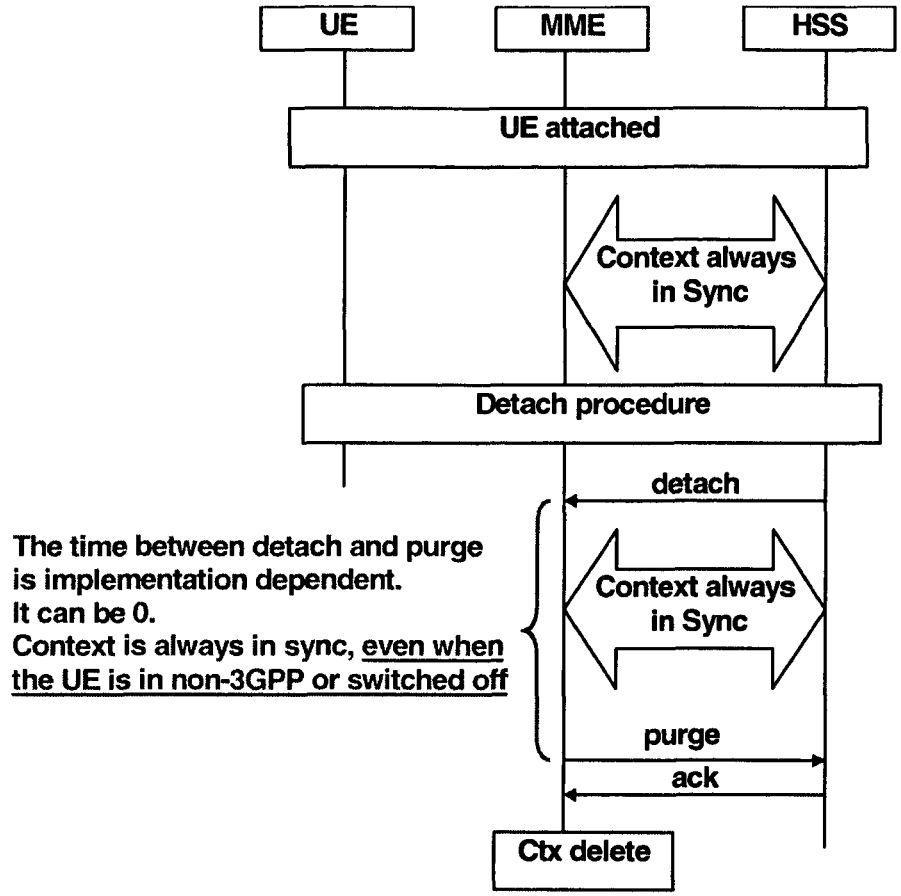
FIG. 1 shows the prior art of the Context at MME procedure.
Figure 2:
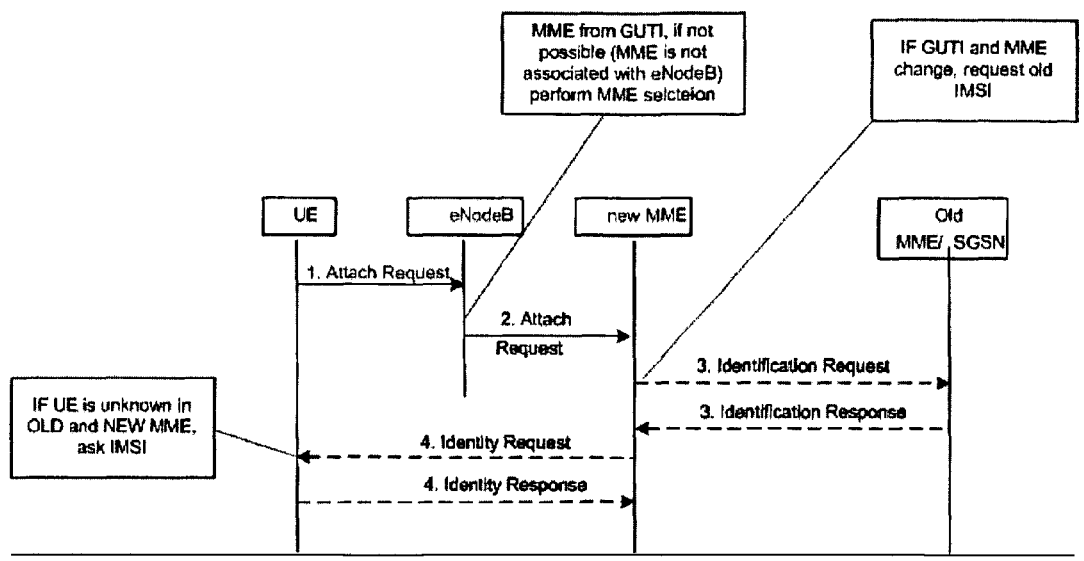
FIG. 2 shows the prior art: Start of the "Attach Request" procedure.
Figure 3:
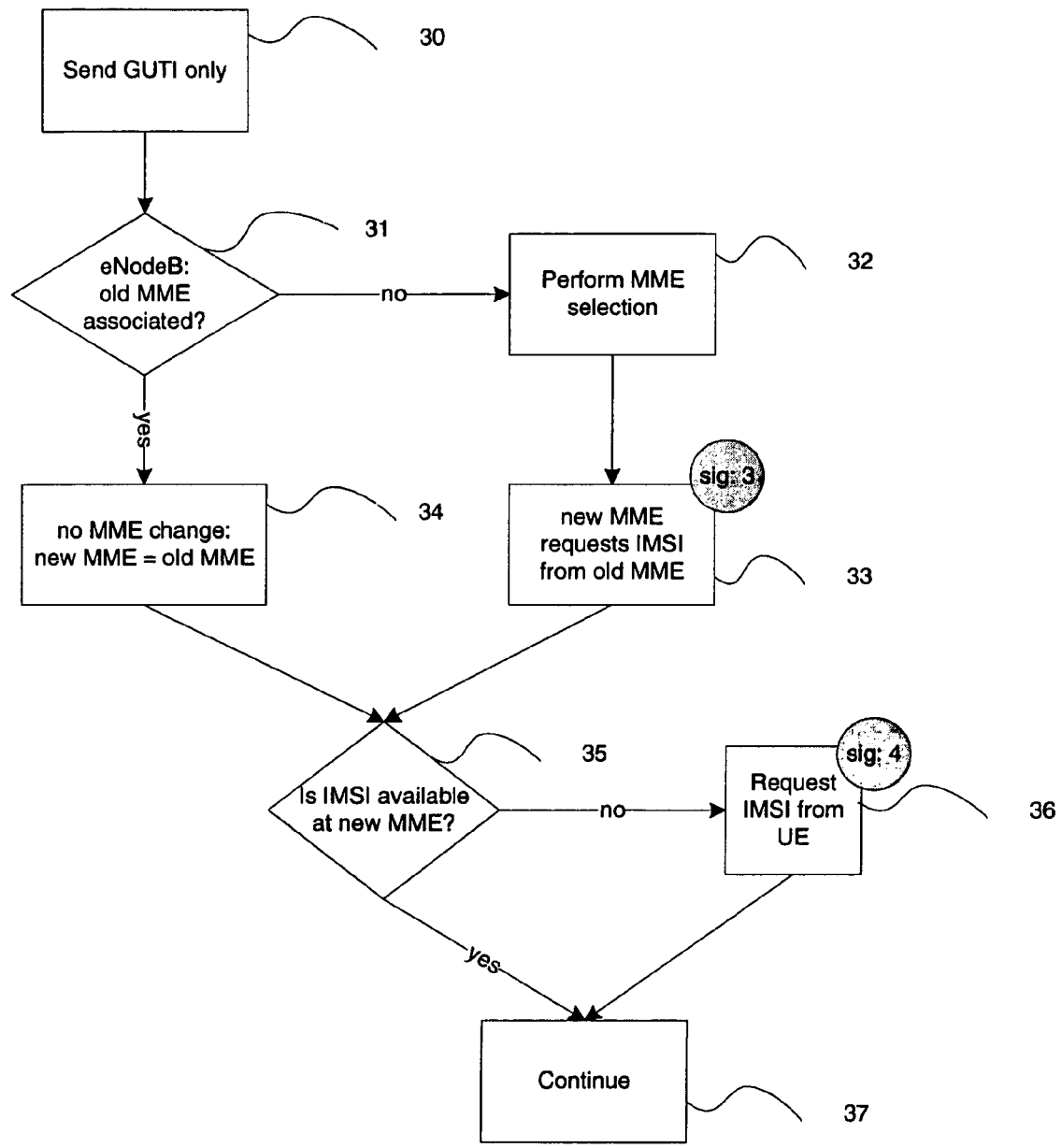
FIG. 3 shows a flow chart of "Attach Request" if UE sends its GUTI according to the prior art.

The goal of this invention is to minimize the frequency of the signalling messages in step 33 (sig: 3) and 36 (sig: 4) of FIG. 3, so the problem to be solved is to minimize the need for signalling in these steps.

The main idea is that the UE uses hints to predict the state of its cached context at the MME, and reacts according to its prediction with the goal to save signalling and obtain a faster setup completion.

Depending on the guess of the UE one of the following cases apply:

If the UE guesses that UE is not known at old and new MME, then the UE sends its IMSI and GUTI at network attach.

If guess is right (UE is unknown)

Advantage: Signalling #3 and #4 can be saved

Disadvantage: none

If guess is wrong (UE is known)

Advantage: none

Disadvantage: IMSI unnecessarily sent over the air

If the UE guesses that UE is known at old or new MME, then the UE sends only its GUTI at network attach.

If guess is right (UE is known)

Advantage: none

Disadvantage: none

If guess is wrong (UE is unknown)

Advantage: none

Disadvantage: Current situation. IMSI must be sent later.

Figure 5:
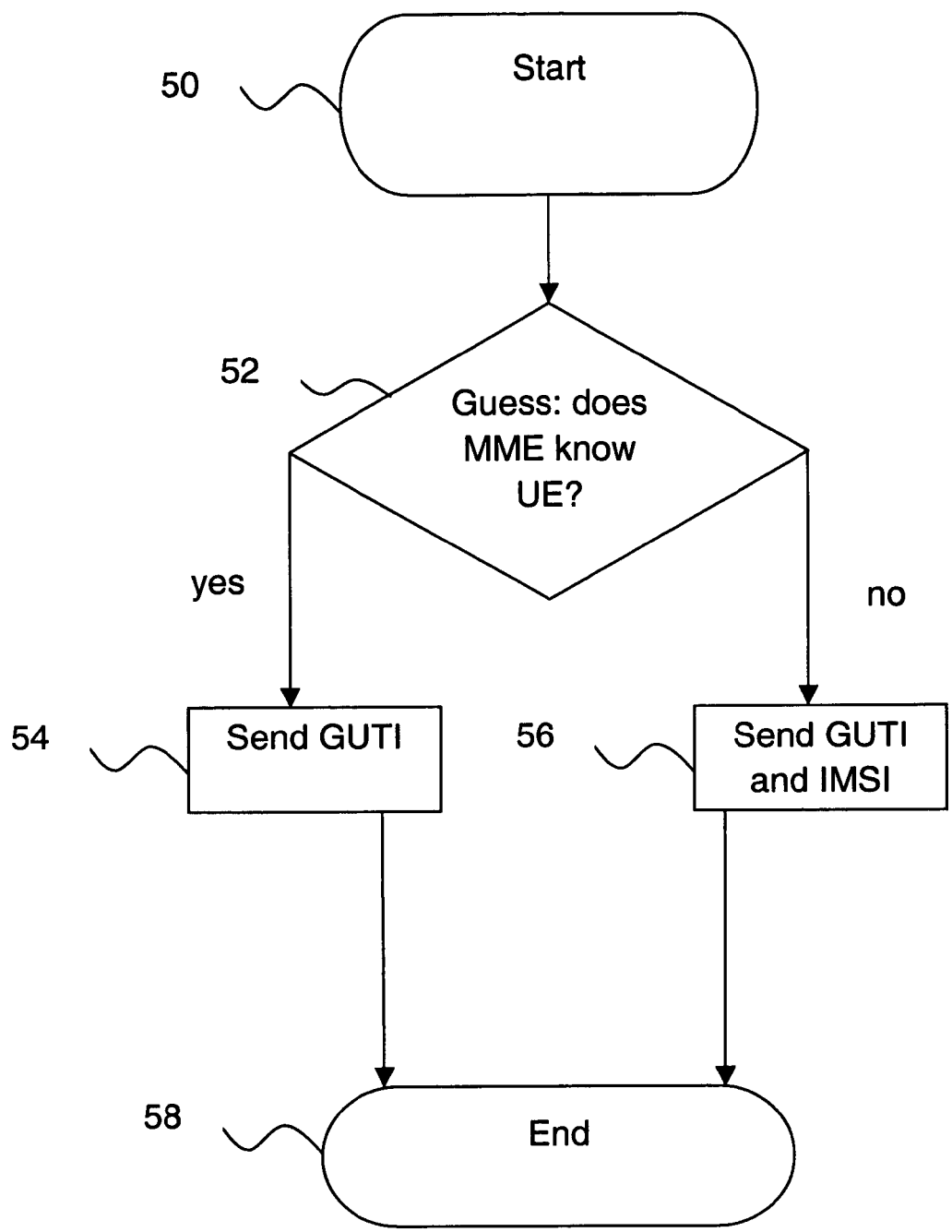
FIG. 5 depicts a flow chart of the main idea.

The principle of the invention is also described in FIG. 5. Here during the network attachment procedure the user equipment provides an estimate whether it is unknown at the mobility management entity in step 52. If it estimates that it is known only the temporary identity (GUTI) is sent in step 54, if it is estimated that it is unknown both the identity (IMSI) and temporary identity (GUTI) are sent in step 56.

Figure 6:
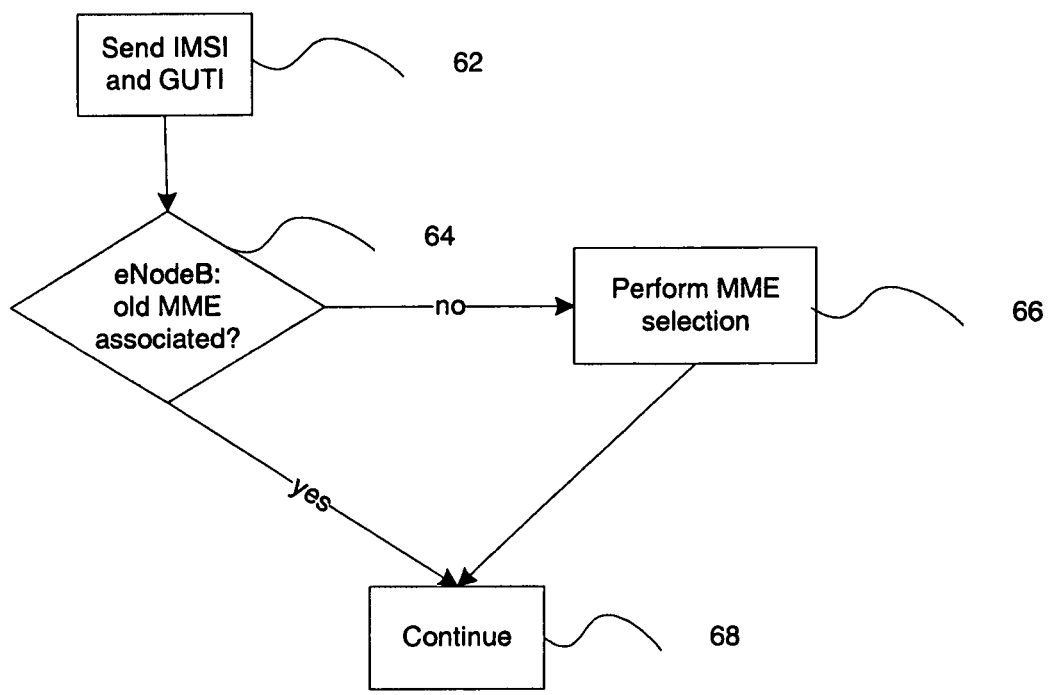
FIG. 6 is a flow chart of the situation when the UE estimates that its identity is not known at the MME.

FIG. 6 shows the case of the UE estimating that it is unknown at the MME. In this case the UE sends both the IMSI and the GUTI in step 62. In step 64 the base station then decides whether the old MME is still associated with the UE. If not, MME selection is performed in step 66, if the old MME is still associated the network attachment procedure is continued.

Figure 7:
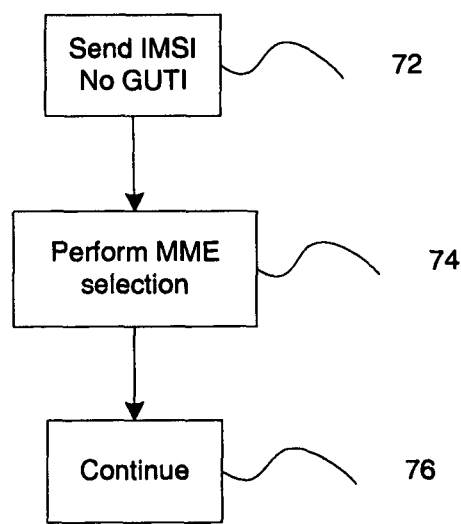
FIG. 7 is a flow chart of the process when the UE has no temporary identity (prior art)

There is also a possibility that the UE no longer has a temporary identity (GUTI), which is depicted in FIG. 7. In this case the UE sends only its identity (IMSI)—it cannot send its temporary identity, as it no longer has one. MME selection then needs to be performed in step 74 before the network attachment procedure can be continues with step 76.

Before describing the various guessing methods that can be used by the UE, the next section discusses in general how guessing can be based on probabilities.

UE Guessing with and without Probabilities

Figure 4:
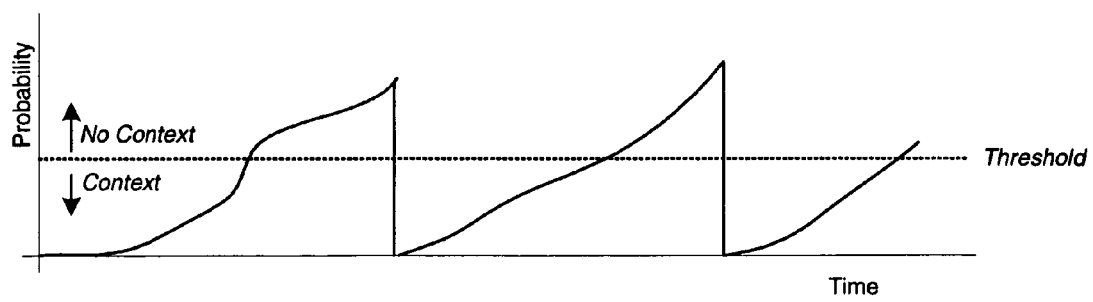
FIG. 4 is a graph showing the interrelationship between threshold and probability.

The decision by the UE about the existence of its context at the MME, is finally a yes/no decision. Events might occur where the UE can make a definite choice, while other might increase or decrease the likelihood of a specific choice. As illustrated in FIG. 4, the UE could keep track of the events happening and compute a probability about its context at the MME. Using threshold values, the UE can make a yes/no decision.

Guessing Method 1

This section describes the first method that the UE may use to guess about the state of the context. This method is based on the assumption that the MME will keep its context longer than usual after an update to the UE's context took place.

The idea is that the UE has updated its HSS context shortly before so that the context-timeout at the MME is reset. Therefore the context will be available for an extended period.

Examples for a context updates are:
Change in subscribed QoS profile;
PGW ("Packet Data Network Gateway (PDN-GW))-address change;
IP-address change; and
Closed subscriber group join/leave.

These context updates can occur, when a subscriber's contract is changed, for example.

The advantage of this method is that the guessing of the UE can be improved, without using extra signalling (signalling is implicit).

An additional advantage is that UE's that pro-actively update their context, can extend the period of its context at the MME. This can be used if the UE does not want to send its IMSI (to maintain its location privacy).

Guessing Method 2

The basic idea of guessing method 2 is that the UE performs measurements during its operation and keeps track of this data. Based on the history data, the UE could for example know the average time MMEs keep the context.

The learning by the UE can be performed by starting a timer after detaching from 3GPP, and upon reattach with the same MME, the UE can detect if the context is still at the MME.

When enough data is collected, the UE can statistically determine the "best" method of network attach. Next to statistical methods, other methods like: neural networks, genetic algorithms, genetic programming or simulated annealing could be used.

One of the main advantages of this method is that because of the "self-learning" property, the method is largely independent of the actual context caching method at the MME. Further; it can be combined with other guessing methods.

Note that the granularity of the learned data can be varied: The UE could learn the characteristics for each MME independently, per network operator, or other granularities.

Guessing Method 3

The third idea is based on the assumption that whenever an MME was down, rebooted, disconnected or had any other kind of malfunctioning, it probably loses (or invalidates) its cached context about the MME, so that after such an event, the context is not available at the MME anymore.

For the UE to make use of this assumption, it must be able to detect that the MME was down.

The detection works as follows, initially, the UE is attached to a MME through an eNodeB. Now, when the UE returns to the same eNodeB later (by a movement or a switch-off/on) and the UE cannot get a new GUTI, it knows that the old MME is not available. For any subsequent attach request, the UE can guess that its old context has been deleted.

Alternatively, the eNodeB could tell the UE about the "MME down" explicitly. This could include the current up time of the associated MMEs, so that UEs can determine by themselves whether or not their context might still be available.

Guessing Method 4

Guessing method 4 assumes that the MME starts earlier with deleting cached contexts when it serves a very crowded area. The idea is that in a crowded area, the MME has a higher workload, needs more memory and requires more bandwidth. Deleting contexts earlier than normal results (very likely) in less resource consumption at the MME.

The UE could make use of this knowledge, by detecting how busy the MME is and use this information The detection itself could be carried out in various ways:

The UE listens for the frequency of broadcasted paging messages, and might compare this with a "normal value". The idea is that if there are a lot of people, the number of paging messages will also increase. This then gives an idea of the amount of traffic on the MME.

Measurements at the radio level, a high activity could indicate that many users are active. This is on the physical layer and implies that electromagnetic radiation is measured in the UMTS frequency bands.

The disadvantage of this method is, however, that it does not take into account the history of the cell, i.e., how many users were active before. This is important because these previous users probably have their contexts also stored at the MME.

A sub-solution to this problem is that the UE could periodically listen in 3GPP during non-3GPP connection (e.g. in idle periods).

The same principle can be used prior to handover.

Guessing Method 5

Since the time to keep the context at the MME is implementation dependent, it could be that MMEs from specific vendors don't implement it at all. If the UE can find out the vendor of the MME it is attached to, then it could benefit from this information.

The UE could find it out by:
Explicit Signalling

The MME implements specific optional features known to be vendor specific MME behaves standard conform, but may have it own vendor-specific "habits", like differences in timing or default values.

Guessing Method 6

Method 6 is a simple and potentially highly accurate way to inform the UEs about its context at the MME. This is done by explicitly sending informational messages to the UE.

This information could be attached (piggy-backed) to other already existing messages.

An interesting possibility is to use the Access Network Discovery and Selection Function (ANDSF), a feature of Release 8. The purpose of the ANDSF is normally to help the UE in its discovery (and selection) of access networks in the direct neighbourhood of the UE. So, the ANDSF has knowledge of the position on the UE.

While UE is in non 3G, the ANDSF could know the location of the UE and could decide that the UE should or should not use its GUTI.

It is assumed that the ANDSF knows where the UE's context is located (old-MME) and has information about the delay paths between MMEs and HSS, then the ANDSF can calculate the estimated cost (e.g. delay) of:

Attach with GUTI (without IMSI), and
Attach with IMSI (with or without GUTI)

The results of the calculations are sent to the UE so that the UE can decide the fastest method (as explained below).

Let, $Cost(IMSI)=A$ msec.

$Cost(GUTI)=B$ msec.

Now, the UE has basically two options: Send its IMSI, or send GUTI. If it sends its IMSI, then the network knows the identity, so no further messages are needed to find out the identity of the UE. So in this case the total cost is Cost(IMSI)=A. If the UE sends its GUTI, then there is the probability that the context exists at the old MME, so the UE identity is known (cost=B). In the other case the identity is unknown; the UE must still send its IMSI, so the cost equals A+B.

If the UE has a guess about the probability P, then it can calculate an optimal strategy at the beginning. The UE needs to compute the minimum of A and $P*B+(1-P)*(A+B)$ In other words, if $A<P*B+(1-P)*(A+B)$ the UE should first send its IMSI, otherwise it should first send its GUTI.

The decision tree can be extended by distinguishing between sending the IMSI with or without the GUTI. The advantage of sending both is that the network does not need to perform "New MME Selection" if the GUTI is valid.

Since there are no strong arguments against sending both simultaneously, it is assumed that the UE will always send its GUTI (if available) with its IMSI. Note that this has no impact on the main goal of this invention—to get the identity of the UE efficiently since the identity is fully known by the IMSI alone.

HSS Aided Guessing

A variant of the main idea is where the HSS helps the UE in its guess. If the HSS exactly knows how the UE guesses, then the HSS knows when the UE is wrong. When this happens, the HSS could inform the UE about its wrong guess so that the UE knows the real status.

It should be noted that the HSS always knows whether or not the UE's context is at the MME.

What complicates the matter is that the UE and HSS might use different inputs and/or algorithms in their guesses, so that not only the UE may be wrong in its guess, but also the HSS.

Figure 8:
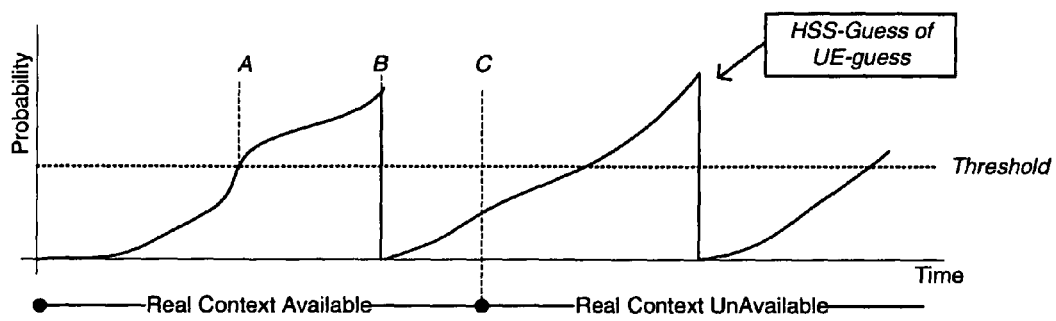
FIG. 8 shows the probabilities of the HSS guessing in combination with the real context available at the HSS.
Figure 9:
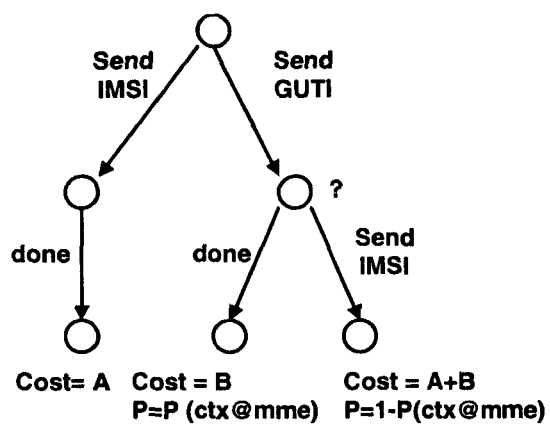
FIG. 9 shows a decision tree with corresponding costs for one embodiment of the invention.

This is illustrated in FIG. 8, where the real situation regarding the UE's context at the MME, and the HSS-guess of how the UE guesses is shown. At point A, the HSS believes, that the UE guesses "no context", but the HSS knows that the context is actually available. The HSS could now inform (after a certain delay) the UE that it is wrong, and the UE updates its current guess. At the same time, the HSS updates its guess about the UE's guess.

At point C, the context is deleted at the MME and the HSS is informed about this. Again, the HSS thinks that the UE has a wrong guess, and could inform the UE again (not shown in the figure).

All the methods and embodiments described above can be used on their own, or in any combination with each other to further improve the estimation accuracy.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

The invention claimed is:

1. A network connection establishment method carried out by a user equipment in a mobile communication system, wherein the mobile communication system comprises plural access networks with different technologies and a plurality of mobility management entities, and wherein the user equipment has plural identities and is within a first of the plural access networks, the method comprising:
receiving, via the first of the plural access networks, an indication message indicating whether a context of the user equipment is available at one of the plurality of mobility management entities;
determining, based on the received indication message, whether the context of the user equipment is valid;
selecting, based on the determining result, which one of the user equipment's plural identities is to be used for establishing a connection to the first or a second of the plural access networks; and
transmitting the selected user equipment's identity to the one of the first or the second of the plural access networks, to which a connection is to be established by the user equipment.

2. The network connection establishment method according to claim 1, wherein the user equipment's selected identity is transmitted, when the user equipment moves to the second of the plural access networks and when a connection is to be established to the second of the plural access networks.

3. The network connection establishment method according to claim 1, wherein the indication message is attached to an already existing message.

4. The network connection establishment method according to claim 3, wherein the existing message is an access network discovery and selection function message.

5. A user equipment in a mobile communication system carrying out a network connection establishment method, wherein the mobile communication system comprises plural access networks with different technologies and a plurality of mobility management entities, and wherein the user equipment has plural identities and is within a first of the plural access networks, the user equipment comprising:

a receiving unit that receives, via the first of the plural access networks, an indication message indicating whether a context of the user equipment is available at one of the plurality of mobility management entities;

a determining unit that determines, based on the received indication message, whether the context of the user equipment is valid;

a selecting unit that selects, based on the determination result, which one of the user equipment's plural identities is to be used for establishing a connection to the first or a second of the plural access networks; and a transmitting unit that transmits the user equipment's selected identity to the one of the first or the second of the plural access networks, to which a connection is to be established by the user equipment.

6. The user equipment according to claim 5, wherein the transmitting unit transmits the user equipment's selected identity, when the user equipment moves to the second of the plural access networks and when a connection is to be established to the second of the plural access networks.

* * * * *